US012804604B2

(12) United States Patent
Fu

(10) Patent No.: US 12,804,604 B2
(45) Date of Patent: Nov. 17, 2026

(54) METHOD AND APPARATUS FOR TRANSMITTING ENERGY-SAVING INDICATION INFORMATION, METHOD AND APPARATUS FOR RECEIVING ENERGY-SAVING INDICATION INFORMATION, AND DEVICE AND STORAGE MEDIUM

(71) Applicant: BEIJING XIAOMI MOBILE SOFTWARE CO., LTD., Beijing (CN)

(72) Inventor: Ting Fu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 267 days.

(21) Appl. No.: 18/700,224

(22) PCT Filed: Oct. 15, 2021

(86) PCT No.: PCT/CN2021/124086
§ 371 (c)(1),
(2) Date: Apr. 10, 2024

(87) PCT Pub. No.: WO2023/060553
PCT Pub. Date: Apr. 20, 2023

(65) Prior Publication Data
US 2025/0016737 A1 Jan. 9, 2025

(51) Int. Cl.
*H04W 68/02* (2009.01)
*H04W 52/02* (2009.01)
*H04W 72/231* (2023.01)

(52) U.S. Cl.
CPC ....... *H04W 68/02* (2013.01); *H04W 52/0235* (2013.01); *H04W 72/231* (2023.01)

(58) Field of Classification Search
CPC ......................... H04W 68/02; H04W 52/0235; H04W 72/231
See application file for complete search history.

(56) References Cited

U.S. PATENT DOCUMENTS

| | | | | |
|---|---|---|---|---|
| 10,375,671 | B2 * | 8/2019 | Wang | H04B 7/0617 |
| 2018/0368101 | A1 * | 12/2018 | Agiwal | H04W 68/02 |
| 2020/0351821 | A1 * | 11/2020 | Wang | H04W 52/0216 |
| 2022/0408360 | A1 * | 12/2022 | Cao | H04M 1/72448 |
| 2023/0043139 | A1 * | 2/2023 | Hwang | H04W 52/0219 |
| 2024/0089921 | A1 * | 3/2024 | Ma | H04L 5/0053 |
| 2024/0244583 | A1 * | 7/2024 | Cui | H04W 72/0446 |

FOREIGN PATENT DOCUMENTS

| | | |
|---|---|---|
| CN | 109286966 A | 1/2019 |
| CN | 113163476 A | 7/2021 |
| WO | WO 2021180206 A1 | 9/2021 |

OTHER PUBLICATIONS

PCT/CN2021/124086 International Search Report dated Jun. 24, 2022, 2 pages.

(Continued)

*Primary Examiner* — Mohamed Barakat
(74) *Attorney, Agent, or Firm* — Cozen O'Connor

(57) ABSTRACT

A method for transmitting energy-saving indication information includes: sending a system message to a user device, wherein the system message comprises information used for indicating to enable a paging early indication (PEI).

19 Claims, 5 Drawing Sheets

(56) References Cited

OTHER PUBLICATIONS

Transsion Holdings "Discussion on PEI design" 3GPP TSG RAN WG1 #106bis-e, R1-2108888, Oct. 2021, 5 pages.
Mediatek "Summary#2 of Paging Enhancements" 3GPP TSG RAN WG1 #106bis-e, R1-210XXXX, Oct. 2021, 40 pages.
Xiaomi "Paging enhancements for power saving" 3GPP TSG RAN WG1 #106b, R1-2109422, Oct. 2021, 3 pages.
Mediatek "Summary#1 of Paging Enhancements" 3GPP TSG RAN WG1 #106bis-e, R1-2109582, Oct. 2021, 23 pages.
Ericsson "Design of Paging Enhancements" 3GPP TSG RAN WG1 #106-bis-e, R1-2110136, Oct. 2021, 10 pages.
Samsung "Discussion on paging enhancements" 3GPP TSG RAN WG1 #106bis, R1-2109500, Oct. 2021, 4 pages.
Chinese Patent Application No. 202180003234.X, Office Action with English translation dated Aug. 12, 2025, 18 pages.
European Patent Application No. 21960285.1 Search and Opinion dated Jul. 30, 2025, 11 pages.

* cited by examiner

METHOD AND APPARATUS FOR TRANSMITTING ENERGY-SAVING INDICATION INFORMATION, METHOD AND APPARATUS FOR RECEIVING ENERGY-SAVING INDICATION INFORMATION, AND DEVICE AND STORAGE MEDIUM

CROSS REFERENCE TO RELATED APPLICATIONS

This application is a U.S. national phase of International Application No. PCT/CN2021/124086, filed on Oct. 15, 2021, the entire contents of which are incorporated herein by reference.

TECHNICAL FIELD

The disclosure relates to the field of wireless communication technology, more particularly, to a method and an apparatus for transmitting and receiving energy-saving indication information, a device, and a storage medium.

BACKGROUND

A Common Search Space (CSS) is a search space that a user equipment (US) searches to identify signals or signaling messages. Multiple Common Search Spaces (CSSs) are defined in the 5G New Radio (NR) system for transmitting common downlink control information.

When a user device is in a Radio Resource Control (RRC) idle state or an RRC inactive state, a main behavior of the user device is to periodically monitor a paging message, and the user device enters an RRC connection state for normal communication after receiving the paging message. Moreover, for a user device, its corresponding Paging Occasion (PO) occurs periodically.

SUMMARY

According to a first aspect of embodiments of the disclosure, a method for transmitting energy-saving indication information is provided. The method is performed by a network device. The method includes:

sending a system message to a user device, in which the system message includes information for indicating to enable a paging early indication (PEI).

According to a second aspect of embodiments of the disclosure, a method for receiving energy-saving indication information is provided. The method is performed by a user equipment. The method includes:

receiving a system message from a network device, in which the system message includes information for indicating to enable a paging early indication (PEI).

According to a third aspect of embodiments of the disclosure, a network device is provided. The network device includes:

a processor; and a memory for storing instructions executable by the processor.

The processor is configured to execute the instructions in the memory, to perform the above steps of the method for transmitting energy-saving indication information.

According to a fourth aspect of embodiments of the disclosure, a mobile terminal is provided. The mobile terminal includes:

a processor; and a memory for storing instructions executable by the processor.

The processor is configured to execute the instructions in the memory, to perform the above steps of the method for receiving energy-saving indication information.

It should be understood that the general description above and the detailed description in the following are only illustrative and explanatory, and do not limit the disclosure.

BRIEF DESCRIPTION OF THE DRAWINGS

The accompanying drawings described here are intended to provide a further understanding of the embodiments of the disclosure, and form a part of the disclosure. The illustrative embodiments and their explanations of the embodiments of the disclosure are used to explain the embodiments of the disclosure, and do not constitute an improper limitation of the embodiments of the disclosure.

The accompanying drawings, which are incorporated into and constitute a part of this specification, illustrate embodiments consistent with the embodiments of the disclosure and, together with the description, serve to explain the principles of the embodiments of the disclosure.

DETAILED DESCRIPTION

Further explanation of embodiments of the disclosure is provided with reference to accompanying drawings and detailed implementation.

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the embodiments of the disclosure. Instead, they are merely examples of apparatuses and methods consistent with aspects related to the disclosure as recited in the appended claims.

It should be noted that in an embodiment of the disclosure, multiple steps may be included. For ease of description, these steps are numbered. However, these numbers are not a limitation on time slots and order of execution between steps. These steps may be implemented in any order, which is not limited in embodiments of the disclosure.

In multiple Common Search Spaces (CSSs) defined in a 5G New Radio (NR) system, Type #0/0-A CSS is a common search space for transmitting downlink control information (DCI) related to scheduling a system message, Type #1 CSS is a common search space for transmitting DCI related to a random access process, and Type #2 CSS is a common search space for transmitting DCI related to scheduling paging. If the Type #2 CSS is not configured, Type #0 CSS is used to transfer the DCI for scheduling paging.

In current protocols, the user device needs to wake up in each paging cycle to synchronize and blindly check for its own Paging DCI in its corresponding PO. In R17, in order to save terminal energy consumption in the idle state, a base station may send a paging early indication (PEI) to the user device. The PEI is carried by DCI.

When a base station sends a (PEI to a user device, if the PEI indicates the user device to go to its own Paging Occasion (PO) to monitor paging DCI, the user device may perform monitoring. If the PEI indicates the terminal not to go to its own PO to monitor paging DCI, the user device does not need to monitor. Thus, unnecessary power consumption for waking up software and hardware for synchronization may be avoided.

Figure 1:
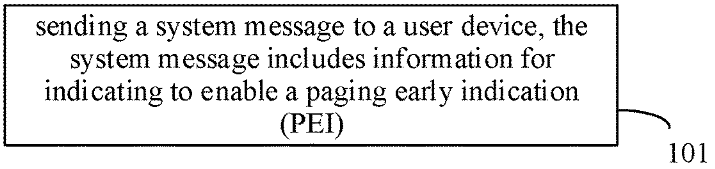
FIG. 1 is a flowchart of a method for transmitting energy-saving indication information according to an embodiment of the disclosure.

Embodiments of the disclosure provide a method for transmitting energy-saving indication information, which is performed by a network device. The method may be performed independently or in combination with any other embodiment of the disclosure. FIG. 1 is a flowchart of a method for transmitting energy-saving indication information according to an embodiment of the disclosure. As shown in FIG. 1, the method includes followings.

Step 101, a system message is sent to a user device, and the system message includes information for indicating to enable a PEI.

In an implementation, the network device sends the system message to the user device, and the system message includes the information for indicating to enable the PEI. In an implementation, the network device sends the system message to the user device, the system message includes a higher-layer parameter, and the higher-layer parameter represents the information for indicating to enable the PEI.

In the above implementations, the network device explicitly enables the PEI by sending the system message to the user device, so that the user device can avoid unnecessary power consumption for waking up software and hardware for synchronization.

Embodiments of the disclosure provide a method for transmitting energy-saving indication information, which is performed by a network device. The method may be performed independently or in combination with any other embodiment of the disclosure. The method includes: sending a system message to a user device, in which the system message includes information for indicating to enable a PEI, the system message further includes a higher-layer parameter representing the information for indicating to enable the PEI.

In an implementation, the network device sends the system message to the user device, and the system message includes the higher-layer parameter representing the information used for indicating to enable the PEI. The higher-layer parameter herein is defined to represent the information used for indicating to enable the PEI.

In the above implementations, the network device explicitly enables the PEI by sending the system message to the user device, so that the user device can avoid unnecessary power consumption for waking up software and hardware for synchronization.

Embodiments of the disclosure provide a method for transmitting energy-saving indication information, which is performed by a network device. The method may be performed independently or in combination with any other embodiment of the disclosure. The method includes: sending a system message to a user device, in which the system message includes information for indicating to enable a PEI, the system message further includes a number of user device groups corresponding to each PO supported by the PEI.

In an implementation, the network device sends the system message to the user device, and the system message includes the information for indicating to enable the PEI and the number of user device groups corresponding to each PO supported by the PEI. In an implementation, the network device sends the system message to the user device, the system message includes a higher-layer parameter representing the information for indicating to enable the PEI, and the system message also includes the number of user device groups corresponding to each PO supported by the PEI.

Multiple user devices may monitor paging messages in one PO, thus the multiple user devices corresponding to one PO may be grouped.

In the above implementations, the network device explicitly enables the PEI by sending the system message to the user device, so that the user device can avoid unnecessary power consumption for waking up software and hardware for synchronization.

Embodiments of the disclosure provide a method for transmitting energy-saving indication information. The method is performed by a network device. The method may be performed independently or in combination with any other embodiment of the disclosure. The method includes: sending a system message to a user device, in which the system message includes information for indicating to enable a PEI, and the system message further includes a number of POs corresponding to the PEI.

In an implementation, the network device sends the system message to the user device, and the system message includes the information for indicating to enable the PEI and the number of POs corresponding to the PEI. In an implementation, the network device sends the system message to the user device, the system message further includes a higher-layer parameter representing information used to indicate to enable the PEI, and the system message also includes the number of POs corresponding to the PEI.

In the above implementations, the network device explicitly enables the PEI by sending the system message to the user device, so that the user device can avoid unnecessary power consumption for waking up software and hardware for synchronization.

Embodiments of the disclosure provide a method for transmitting energy-saving indication information. The method is performed by a network device. The method may be performed independently or in combination with any other embodiment of the disclosure. The method includes: sending a system message to a user device, in which the system message includes information for indicating to enable a PEI, and the system message further includes a number of user device groups corresponding to each PO supported by the PEI and a number of POs corresponding to the PEI.

In an implementation, the network device sends the system message to the user device, and the system message includes the information for indicating to enable the PEI, the number of user device groups corresponding to each PO supported by the PEI, and the number of POs corresponding to the PEI. In an implementation, the network device sends the system message to the user device, the system message includes a higher-layer parameter representing the information for indicating to enable the PEI, and the system message also includes the number of user device groups corresponding to each PO supported by PEI and the number of POs corresponding to the PEI.

One PEI may correspond to one PO or multiple POs.

In the above implementations, the network device explicitly enables the PEI by sending the system message to the user device, so that the user device can avoid unnecessary power consumption for waking up software and hardware for synchronization.

Figure 2:
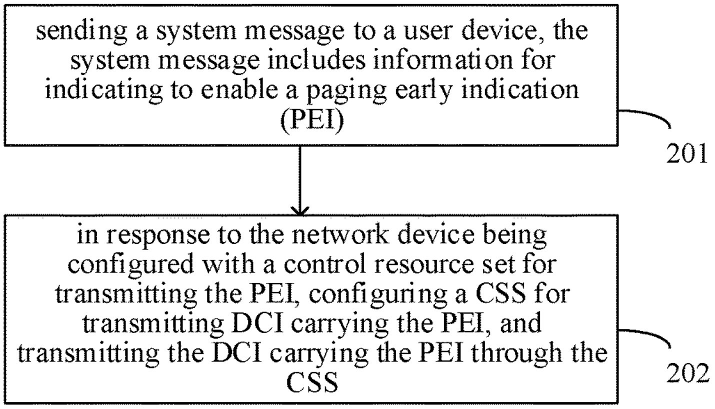
FIG. 2 is a flowchart of a method for transmitting energy-saving indication information according to an embodiment of the disclosure.

Embodiments of the disclosure provide a method for transmitting energy-saving indication information. The method is performed by a network device. The method may be performed independently or in combination with any other embodiment of the disclosure. FIG. 2 is a flowchart of a method for transmitting energy-saving indication information according to an embodiment of the disclosure. As shown in FIG. 2, the method includes followings.

Step 201, a system message is sent to a user device, and the system message includes information for indicating to enable a PEI.

Step 202, in response to the network device being configured with a control resource set for transmitting the PEI, a CSS for transmitting DCI carrying the PEI is configured, and the DCI carrying the PEI is transmitted through the configured CSS.

In an implementation, the network device sends the system message to the user device, and the system message includes the information for indicating to enable the PEI. In response to the network device being configured with the control resource set for transmitting the PEI, the CSS for transmitting the DCI carrying the PEI is configured. Then, the DCI carrying the PEI is transmitted through the configured CSS. In an implementation, the CSS is configured by the network device for transmitting the DCI carrying the PEI. In an implementation, the network device sends the information for indicating to enable the PEI through a higher-layer parameter in the system message.

In the above implementations, the network device explicitly enables the PEI by sending the system message to the user device, so that the user device can avoid unnecessary power consumption for waking up software and hardware for synchronization. Moreover, the DCI carrying the PEI may be transmitted through the newly configured CSS or an existing CSS.

Figure 3:
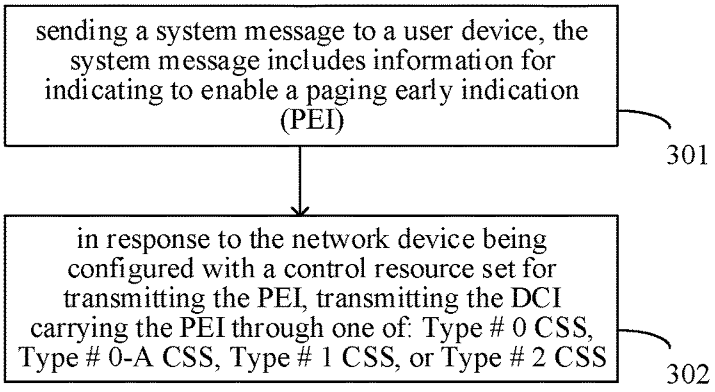
FIG. 3 is a flowchart of a method for transmitting energy-saving indication information according to an embodiment of the disclosure.

Embodiments of the disclosure provide a method for transmitting energy-saving indication information. The method is performed by a network device. The method may be performed independently or in combination with any other embodiment of the disclosure. FIG. 3 is a flowchart of a method for transmitting energy-saving indication information according to an embodiment of the disclosure. As shown in FIG. 3, the method includes followings.

Step 301, a system message is sent to a user device, and the system message includes information for indicating to enable a PEI.

Step 302, in response to the network device being configured with a control resource set for transmitting the PEI, DCI carrying the PEI is transmitted through one of: Type #0 CSS, Type #0-A CSS, Type #1 CSS, or Type #2 CSS.

In an implementation, the network device sends the system message to the user device, and the system message includes the information for indicating to enable the PEI. In response to the network device being configured with the control resource set for transmitting the PEI, the DCI carrying the PEI is transmitted through one of: Type #0 CSS, Type #0-A CSS, Type #1 CSS, or Type #2 CSS. Here, Type #0 CSS, Type #0-A CSS, Type #1 CSS, and Type #2 CSS are CSSs used to transmit common downlink control information. In an implementation, the network device sends the information for indicating to enable the PEI through a higher-layer parameter in the system message.

In the above implementations, the network device explicitly enables the PEI by sending the system message to the user device, so that the user device can avoid unnecessary power consumption for waking up software and hardware for synchronization. Moreover, the DCI carrying the PEI may be transmitted through a newly configured CSS or an existing CSS.

Figure 4:
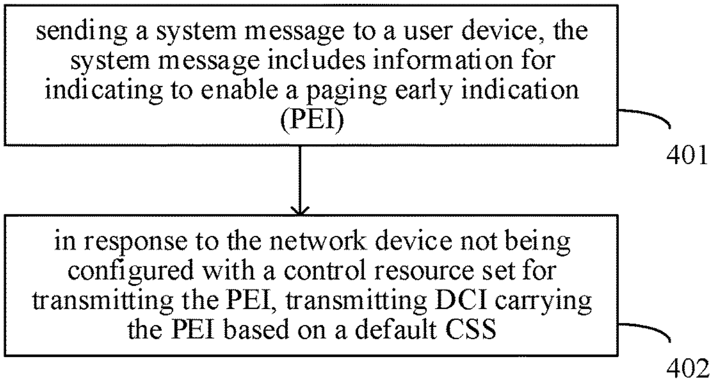
FIG. 4 is a flowchart of a method for receiving energy-saving indication information according to an embodiment of the disclosure.

Embodiments of the disclosure provide a method for transmitting energy-saving indication information. The method is performed by a network device. The method may be performed independently or in combination with any other embodiment of the disclosure. FIG. 4 is a flowchart of a method for transmitting energy-saving indication information according to an embodiment of the disclosure. As shown in FIG. 4, the method includes followings.

Step 401, a system message is sent to a user device, and the system message includes information for indicating to enable a PEI.

Step 402, in response to the network device not being configured with a control resource set for transmitting the PEI, DCI carrying the PEI is transmitted based on a default CSS.

In an implementation, the network device sends the system message to the user device, and the system message includes the information for indicating to enable the PEI. In response to the network device not being configured with the control resource set for transmitting the PEI, the DCI carrying the PEI is transmitted based on the default CSS. In an implementation, the network device sends the information for indicating to enable the PEI through a higher-layer parameter in the system message.

In the above implementations, the network device explicitly enables the PEI by sending the system message to the user device, so that the user device can avoid unnecessary power consumption for waking up software and hardware for synchronization. Moreover, the DCI carrying the PEI may be transmitted through the default CSS.

Embodiments of the disclosure provide a method for transmitting energy-saving indication information. The method is performed by a network device. The method may be performed independently or in combination with any other embodiment of the disclosure. The method includes: sending a system message to a user device, in which the system message includes information for indicating to enable a PEI; and in response to the network device not being configured with a control resource set for transmitting the PEI, transmitting DCI carrying the PEI based on a default CSS, in which the default CSS is specified by a communication protocol.

In an implementation, the network device sends the system message to the user device, and the system message includes the information for indicating to enable the PEI. In response to the network device not being configured with the control resource set for transmitting the PEI, the DCI carrying the PEI is transmitted based on the default CSS, and the default CSS is specified by the communication protocol. In an implementation, the network device sends the information for indicating to enable the PEI through a higher-layer parameter in the system message.

In the above implementations, the network device explicitly enables the PEI by sending the system message to the user device, so that the user device can avoid unnecessary power consumption for waking up software and hardware for synchronization. Moreover, the DCI carrying the PEI may be transmitted through the default CSS.

Embodiments of the disclosure provide a method for transmitting energy-saving indication information. The method is performed by a network device. The method may be performed independently or in combination with any other embodiment of the disclosure. The method includes: sending a system message to a user device, in which the system message includes information for indicating to enable a PEI; and in response to the network device not being configured with a control resource set for transmitting the PEI, transmitting DCI carrying the PEI through a default CSS. The default CSS is specified by a communication protocol, where the default CSS is a CSS used for transmitting DCI for scheduling paging.

In an implementation, the network device sends the system message to the user device, and the system message includes the information for indicating to enable the PEI. In response to the network device not being configured with the control resource set for transmitting the PEI, the DCI carrying the PEI is transmitted based on the default CSS. The default CSS is specified by the communication protocol, and the default CSS is the CSS used for transmitting DCI for scheduling paging.

In an implementation, the network device configures the CSS for specifically transmitting the DCI used for scheduling paging as Type #2 CSS. That is, the default CSS here is the Type #2 CSS.

In an implementation, if the network device does not configure a CSS for specifically transmitting the DCI used for scheduling paging, the default CSS here is Type #0 CSS.

In the above implementations, the network device explicitly enables the PEI by sending the system message to the user device, so that the user device can avoid unnecessary power consumption for waking up software and hardware for synchronization. Moreover, the DCI carrying the PEI may be transmitted through the default CSS.

Embodiments of the disclosure provide a method for transmitting energy-saving indication information. The method is performed by a network device. The method may be performed independently or in combination with any other embodiment of the disclosure. The method includes: sending a system message to a user device, in which the system message includes information for indicating to enable a PEI; and in response to the network device not being configured with a control resource set for transmitting the PEI, transmitting DCI carrying the PEI based on a default CSS. The default CSS is specified by a communication protocol. The default CSS is one of Type #0 CSS, Type #0-A CSS, Type #1 CSS, or Type #2 CSS.

In an implementation, the network device sends the system message to the user device, and the system message includes the information for indicating to enable the PEI. In response to the network device not being configured to with the control resource set for transmitting the PEI, the DCI carrying the PEI is transmitted based on the default CSS. The default CSS is specified by the communication protocol, and the default CSS is defined as one of: Type #0 CSS, Type #0-A CSS, Type #1 CSS, or Type #2 CSS.

In the above implementations, the network device explicitly enables the PEI by sending the system message to the user device, so that the user device can avoid unnecessary power consumption for waking up software and hardware for synchronization. Moreover, the DCI carrying the PEI may be transmitted through the default CSS.

Embodiments of the disclosure provide a method for transmitting energy-saving indication information. The method includes: configuring a CSS for DCI carrying a PEI by a network device. This situation indicates that the network device enables the PEI. The network device implicitly enable the PEI through the above method.

In an implementation, the network device configures the CSS for transmitting the DCI carrying the PEI, and transmits the DCI carrying the PEI through the configured CSS.

In an implementation, the network device transmits the DCI carrying the PEI through one of the following: Type #0 CSS, Type #0-A CSS, Type #1 CSS, or Type #2 CSS.

In the above implementations, the network device implicitly enables the PEI by configuring the CSS for the DCI carrying the PEI. Correspondingly, if the network device does not configure a CSS for the DCI carrying the PEI, it indicates that the network device does not enable the PEI.

Figure 5:
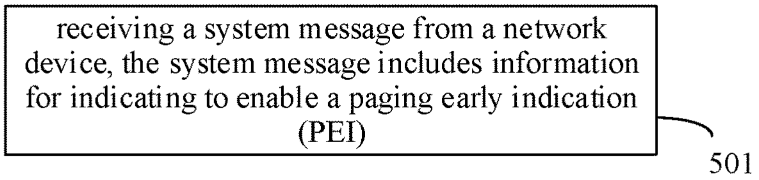
FIG. 5 is a flowchart of a method for receiving energy-saving indication information according to an embodiment of the disclosure.

Embodiments of the disclosure provide a method for receiving energy-saving indication information. The method is performed by a user device. The method may be performed independently or in combination with any other embodiment of the disclosure. FIG. 5 is a flowchart of a method for receiving energy-saving indication information according to an embodiment of the disclosure. As shown in of the disclosure 5, the method includes followings.

Step 501, a system message from a network device is received, and the system message includes information for indicating to enable a PEI.

In an implementation, the user device receives the system message from the network device, and the system message includes the information for indicating to enable the PEI. In an implementation, the user device receives the system message from the network device, and the system message includes a higher-layer parameter representing the information used to indicate to enable the PEI.

In the above implementations, the network device explicitly enables the PEI by sending the system message to the user device, so that the user device monitors paging DCI in a PO only when the PEI indicates the user device to monitor the paging DCI in its own PO, thereby avoiding unnecessary power consumption for waking up software and hardware for synchronization.

Embodiments of the disclosure provide a method for receiving energy-saving indication information. The method is performed by a user device. The method may be performed independently or in combination with any other embodiment of the disclosure. The method includes: receiving a system message from a network device, in which the system message includes information for indicating to enable a PEI, and the system message further includes a higher-layer parameter representing the information for indicating to enable the PEI.

In an implementation, the user device receives the system message from the network device, and the system message includes the higher-layer parameter representing the information used for indicating to enable the PEI. The higher-layer parameter is defined to represent the information used for indicating to enable the PEI.

In the above implementations, the network device explicitly enables the PEI by sending the system message to the user device, so that the user device monitors paging DCI in a PO only when the PEI indicates the user device to monitor the paging DCI in its own PO, thereby avoiding unnecessary power consumption for waking up software and hardware for synchronization.

Embodiments of the disclosure provide a method for receiving energy-saving indication information. The method is performed by a user device. The method may be performed independently or in combination with any other embodiment of the disclosure. The method includes: receiving a system message from a network device, in which the system message includes information for indicating to enable a PEI, and the system message further includes a number of user device groups corresponding to each PO supported by the PEI.

In an implementation, the user device receives the system message from the network device, and the system message includes the information for indicating to enable the PEI and the number of user device groups corresponding to each PO supported by the PEI. In an implementation, the user device receives the system message from the network device, the system message includes a higher-layer parameter representing the information for indicating to enable the PEI, and the system message also includes the number of user device groups corresponding to each PO supported by the PEI.

In the above implementations, the network device explicitly enables the PEI by sending the system message to the user device, so that the user device monitors paging DCI in its own PO only when the PEI indicates the user device to monitor the paging DCI in its own PO, thereby avoiding unnecessary power consumption for waking up software and hardware for synchronization.

Embodiments of the disclosure provide a method for receiving energy-saving indication information. The method is performed by a user device. The method may be performed independently or in combination with any other embodiment of the disclosure. The method includes: receiving a system message from a network device, in which the system message includes information for indicating to enable a PEI, and the system message further includes a number of POs corresponding to the PEI.

In an implementation, the user device receives the system message from the network device, and the system message includes the information for indicating to enable the PEI and the number of POs corresponding to the PEI. In an implementation, the user device receives the system message from the network device, the system message further includes a higher-layer parameter representing the information for indicating to enable the PEI, and the system message also includes the number of POs corresponding to the PEI.

In the above implementations, the network device explicitly enables the PEI by sending the system message to the user device, so that the user device monitors paging DCI in a PO only when the PEI indicates the user device to monitor the paging DCI in its own PO, thereby avoiding unnecessary power consumption for waking up software and hardware for synchronization.

Embodiments of the disclosure provide a method for receiving energy-saving indication information. The method is performed by a user device. The method may be performed independently or in combination with any other embodiment of the disclosure. The method includes: receiving a system message from network device, in which the system message includes information for indicating to enable a PEI, and the system message further includes a number of user device groups corresponding to each PO supported by the PEI and a number of POs corresponding to the PEI.

In an implementation, the user device receives the system message from the network device, and the system message includes the information for indicating to enable the PEI, the number of user device groups corresponding to each PO supported by the PEI, and the number of POs corresponding to the PEI. In an implementation, the user device receives the system message from the network device, the system message includes a higher-layer parameter representing the information for indicating to enable the PEI, and the system message also includes the number of user device groups corresponding to each PO supported by the PEI and the number of POs corresponding to the PEI.

In the above implementations, the network device explicitly enables the PEI by sending the system message to the user device, so that the user device monitors paging DCI in a PO only when the PEI indicates the user device to monitor the paging DCI in its own PO, thereby avoiding unnecessary power consumption for waking up software and hardware for synchronization.

Figure 6:
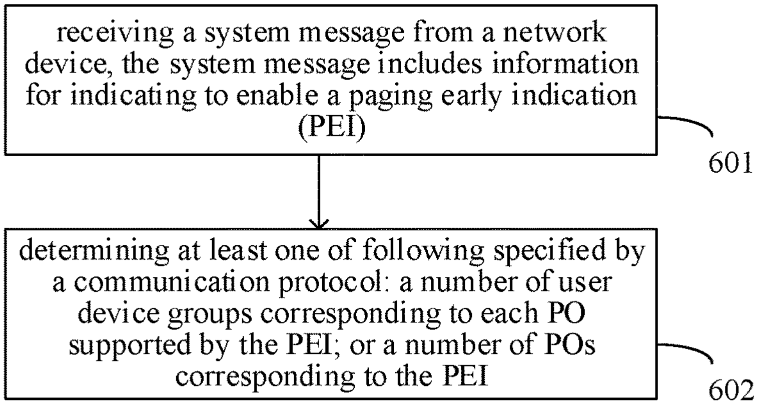
FIG. 6 is a flowchart of a method for receiving energy-saving indication information according to an embodiment of the disclosure.

Embodiments of the disclosure provide a method for receiving energy-saving indication information. The method is performed by a user device. The method may be performed independently or in combination with any other embodiment of the disclosure. FIG. 6 is a flowchart of a method for receiving energy-saving indication information according to an embodiment of the disclosure. As shown in FIG. 6, the method includes followings.

Step 601, a system message from a network device is received, and the system message includes information for indicating to enable a PEI.

Step 602, at least one of following specified by a communication protocol is determined:

1. a number of user device groups corresponding to each PO supported by the PEI; or
2. a number of POs corresponding to the PEI.

In an implementation, the user device receives the system message from the network device, and the system message includes the information for indicating to enable the PEI. The user device determines the number of user device groups corresponding to each PO supported by the PEI based on the communication protocol. In an implementation, the user device receives the system message from the network device, and the system message includes a higher-layer parameter representing the information for indicating to enable the PEI. The user device also determines the number of user device groups corresponding to each PO supported by the PEI based on the communication protocol.

In an implementation, the user device receives the system message from the network device, and the system message includes the information for indicating to enable the PEI and the number of POs corresponding to the PEI. The user device determines the number of POs corresponding to the PEI based on the communication protocol. In an implementation, the user device receives the system message from the network device, and the system message includes a higher-layer parameter representing the information for indicating to enable the PEI. The user device also determines the number of POs corresponding to the PEI based on the communication protocol.

In an implementation, the user device receives the system message from the network device, and the system message includes the information for indicating to enable the PEI. The user device determines the number of user device groups corresponding to each PO supported by PEI and the number of POs corresponding to the PEI based on the communication protocol. In an implementation, the user device receives the system message from the network device, and the system message includes a higher-layer parameter representing the information for indicating to enable the PEI. The user device also determines the number of user device groups corresponding to each PO supported by the PEI and the number of POs corresponding to the PEI based on the communication protocol.

In the above implementations, the network device explicitly enables the PEI by sending the system message to the user device, so that the user device monitors paging DCI in a PO only when the PEI indicates the user device to monitor the paging DCI in its own PO, thereby avoiding unnecessary power consumption for waking up software and hardware for synchronization.

Figure 7:
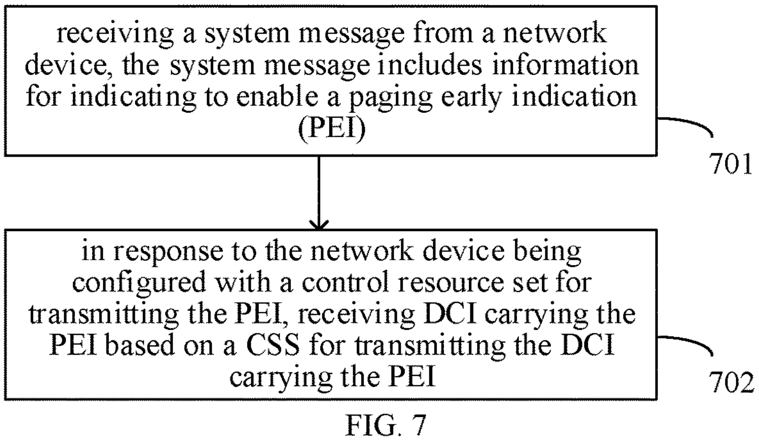
FIG. 7 is a flowchart of a method for receiving energy-saving indication information according to an embodiment of the disclosure.

Embodiments of the disclosure provide a method for receiving energy-saving indication information. The method is performed by a user device. The method may be performed independently or in combination with any other embodiment of the disclosure. FIG. 7 is a flowchart of a method for receiving energy-saving indication information according to an embodiment of the disclosure. As shown in FIG. 7, the method includes followings.

Step 701, a system message from a network device is received, and the system message includes information for indicating to enable a PEI.

Step 702, in response to the network device being configured with a control resource set for transmitting the PEI, DCI carrying the PEI is received based on a CSS for transmitting the DCI carrying the PEI.

In an implementation, the user device receives the system message from a network device, and the system message includes the information for indicating to enable the PEI. In response to the network device being configured with the control resource set for transmitting the PEI, the DCI carrying the PEI is received based on the CSS used for transmitting the DCI carrying the PEI. The CSS here is configured by the network device for transmitting the DCI carrying the PEI. In an implementation, the user device obtains the information for indicating to enable the PEI based on a higher-layer parameter in the system message.

In the above implementations, the network device explicitly enables the PEI by sending the system message to the user device, so that the user device monitors paging DCI in a PO only when the PEI indicates the user device to monitor the paging DCI in its own PO, thereby avoiding unnecessary power consumption for waking up software and hardware for synchronization. Moreover, the user device can receive the DCI carrying the PEI through a newly configured CSS or an existing CSS.

Figure 8:
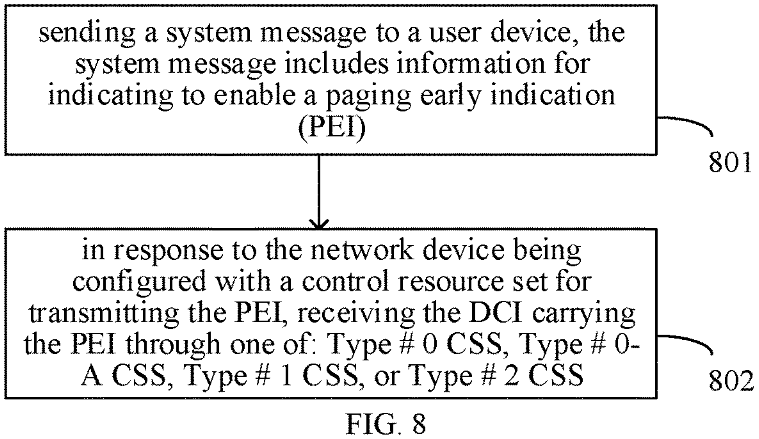
FIG. 8 is a flowchart of a method for receiving energy-saving indication information according to an embodiment of the disclosure.

Embodiments of the disclosure provide a method for receiving energy-saving indication information. The method is performed by a user device. The method may be performed independently or in combination with any other embodiment of the disclosure. FIG. 8 is a flowchart of a method for receiving energy-saving indication information according to an embodiment of the disclosure. As shown in FIG. 8, the method includes followings.

Step 801, a system message from a network device is received, and the system message includes information for indicating to enable a PEI.

Step 802, in response to the network device being configured with a control resource set for transmitting the PEI, DCI carrying the PEI is received through one of: Type #0 CSS, Type #0-A CSS, Type #1 CSS, or Type #2 CSS.

In an implementation, the user device receives the system message from the network device, and the system message includes the information for indicating to enable the PEI. In response to the network device being configured with the control resource set for transmitting the PEI, the DCI carrying the PEI is received through one of: Type #0 CSS, Type #0-A CSS, Type #1 CSS, or Type #2 CSS. Here, Type #0 CSS, Type #0-A CSS, Type #1 CSS, and Type #2 CSS are CSSs used to transmit common downlink control information. In an implementation, the user device obtains the information for indicating to enable the PEI based on a higher-layer parameter in the system message.

In the above implementations, the network device explicitly enables the PEI by sending the system message to the user device, so that the user device monitors paging DCI in a PO only when the PEI indicates the user device to monitor the paging DCI in its own PO, thereby avoiding unnecessary power consumption for waking up software and hardware for synchronization. Moreover, the user device can receive the DCI carrying the PEI through a newly configured CSS or an existing CSS.

Figure 9:
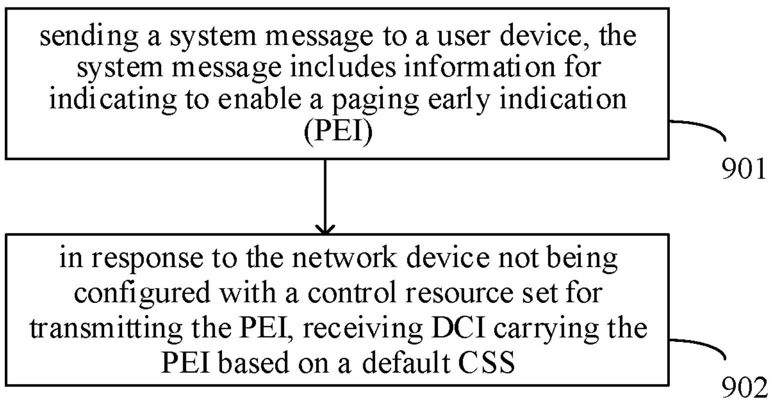
FIG. 9 is a flowchart of a method for receiving energy-saving indication information according to an embodiment of the disclosure.

Embodiments of the disclosure provide a method for receiving energy-saving indication information. The method is performed by a user device. The method may be performed independently or in combination with any other embodiment of the disclosure. FIG. 9 is a flowchart of a method for receiving energy-saving indication information according to an embodiment of the disclosure. As shown in FIG. 9, the method includes followings.

Step 901, a system message from a network device is received, and the system message includes information for indicating to enable a PEI.

Step 902, in response to the network device not being configured with a control resource set for transmitting the PEI, DCI carrying the PEI is received based on a default CSS.

In an implementation, the user device receives the system message from the network device, and the system message includes the information for indicating to enable the PEI. In response to the network device not being configured with the control resource set for transmitting the PEI, the DCI carrying the PEI is received based on the default CSS. In an implementation, the user device obtains the information for indicating to enable the PEI based on a higher-layer parameter in the system message.

In the above implementations, the network device explicitly enables the PEI by sending the system message to the user device, so that the user device monitors paging DCI in a PO only when the PEI indicates the user device to monitor the paging DCI in its own PO, thereby avoiding unnecessary power consumption for waking up software and hardware for synchronization. Moreover, the user device can receive the DCI carrying the PEI through the default CSS.

Embodiments of the disclosure provide a method for receiving energy-saving indication information. The method is performed by a user device. The method may be performed independently or in combination with any other embodiment of the disclosure. The method includes: receiving a system message from a network device, in which the system message includes information for indicating to enable a PEI; and in response to the network device not being configured with a control resource set for transmitting the PEI, receiving DCI carrying the PEI based on a default CSS, in which the default CSS is specified by a communication protocol.

In an implementation, the user device receives the system message from the network device, and the system message includes the information for indicating to enable the PEI. In response to the network device being not configured with the control resource set for transmitting the PEI, the DCI carrying the PEI is received based on the default CSS, and the default CSS is specified by the communication protocol. In an implementation, the user device obtains the information for indicating to enable the PEI based on a higher-layer parameter in the system message.

In the above implementations, the network device explicitly enables the PEI by sending the system message to the user device, so that the user device monitors paging DCI in a PO only when the PEI indicates the user device to monitor the paging DCI in its own PO, thereby avoiding unnecessary power consumption for waking up software and hardware for synchronization. Moreover, the user device can receive the DCI carrying the PEI through the default CSS.

Embodiments of the disclosure provide a method for receiving energy-saving indication information. The method is performed by a user device. The method may be performed independently or in combination with any other embodiment of the disclosure. The method includes: receiving a system message from a network device, in which the system message includes information for indicating to enable a PEI; and in response to the network device not being configured with a control resource set for transmitting the PEI, receiving DCI carrying the PEI based on a default CSS. The default CSS is specified by a communication protocol, where the default CSS is a CSS used for transmitting DCI for scheduling paging.

In an implementation, the user device receives the system message from the network device, and the system message includes the information for indicating to enable the PEI. In response to the network device not being configured with the control resource set for transmitting the PEI, the DCI carrying the PEI is received based on the default CSS. The default CSS is specified by the communication protocol, and the default CSS is the CSS used for transmission DCI for scheduling paging.

In an implementation, if the network device configures the CSS for specifically transmitting the DCI used for scheduling paging as Type #2 CSS, the default CSS here is Type #2 CSS.

In an implementation, if the network device does not configure the CSS for specifically transmitting the DCI used for scheduling paging, the default CSS here is Type #0 CSS.

In the above implementations, the network device explicitly enables the PEI by sending the system message to the user device, so that the user device monitors paging DCI in a PO only when the PEI indicates the user device to monitor the paging DCI in its own PO, thereby avoiding unnecessary power consumption for waking up software and hardware for synchronization. Moreover, the user device can receive the DCI carrying the PEI through the default CSS.

Embodiments of the disclosure provide a method for receiving energy-saving indication information. The method is performed by a user device. The method may be performed independently or in combination with any other embodiment of the disclosure. The method includes: receiving a system message from a network device, in which the system message includes information for indicating to enable a PEI; and in response to the network device not being configured with a control resource set for transmitting the PEI, receiving DCI carrying the PEI based on a default CSS. The default CSS is specified by a communication protocol, in which the default CSS is one of Type #0 CSS, Type #0-A CSS, Type #1 CSS, or Type #2 CSS.

In an implementation, the user device receives the system message from the network device, and the system message includes the information for indicating to enable the PEI. In response to the network device not being configured with the control resource set for transmitting the PEI, the DCI carrying the PEI is received based on the default CSS. The default CSS is specified by the communication protocol and is defined as one of Type #0 CSS, Type #0-A CSS, Type #1 CSS, or Type #2 CSS.

In the above implementations, the network device explicitly enables the PEI by sending the system message to the user device, so that the user device monitors paging DCI in a PO only when the PEI indicates the user device to monitor the paging DCI in its own PO, thereby avoiding unnecessary power consumption for waking up software and hardware for synchronization. Moreover, the user device can receive the DCI carrying the PEI through the default CSS.

Figure 10:
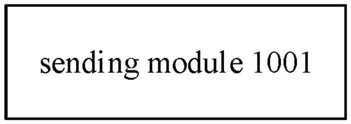
FIG. 10 is a block diagram of an apparatus for transmitting energy-saving indication information according to an embodiment of the disclosure.

Embodiments of the disclosure provide an apparatus for transmitting energy-saving indication information. The apparatus is applied to a network device. As shown in FIG. 10, the apparatus includes:

- a sending module 1001, configured to send a system message to a user device, in which the system message includes information for indicating to enable a paging early indication (PEI).

Figure 11:
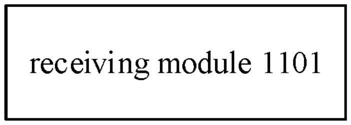
FIG. 11 is a block diagram of an apparatus for receiving energy-saving indication information according to an embodiment of the disclosure.

Embodiments of the disclosure provide an apparatus for receiving energy-saving indication information. The apparatus is applied to a user equipment. As shown in FIG. 11, the apparatus includes:

- a receiving module 1101, configured to receive a system message from a network device, in which the system message includes information for indicating to enable a paging early indication (PEI).

Embodiments of the disclosure provide a network device, including:

- a processor; and
- a memory for storing instructions executable by the processor.

The processor is configured to execute the instructions in the memory, to perform the steps of the above method for transmitting energy-saving indication information.

Embodiments of the disclosure provide a mobile terminal, including:

- a processor; and
- a memory for storing instructions executable by the processor.

The processor is configured to execute the instructions in the memory, to perform the steps of the above method for receiving energy-saving indication information.

Embodiments of the disclosure provide a non-transitory computer-readable storage medium having executable instructions stored thereon. When the executable instructions are executed by a processor, the steps of the above method for transmitting energy-saving indication information or the above method for receiving energy-saving indication information are performed.

Figure 12:
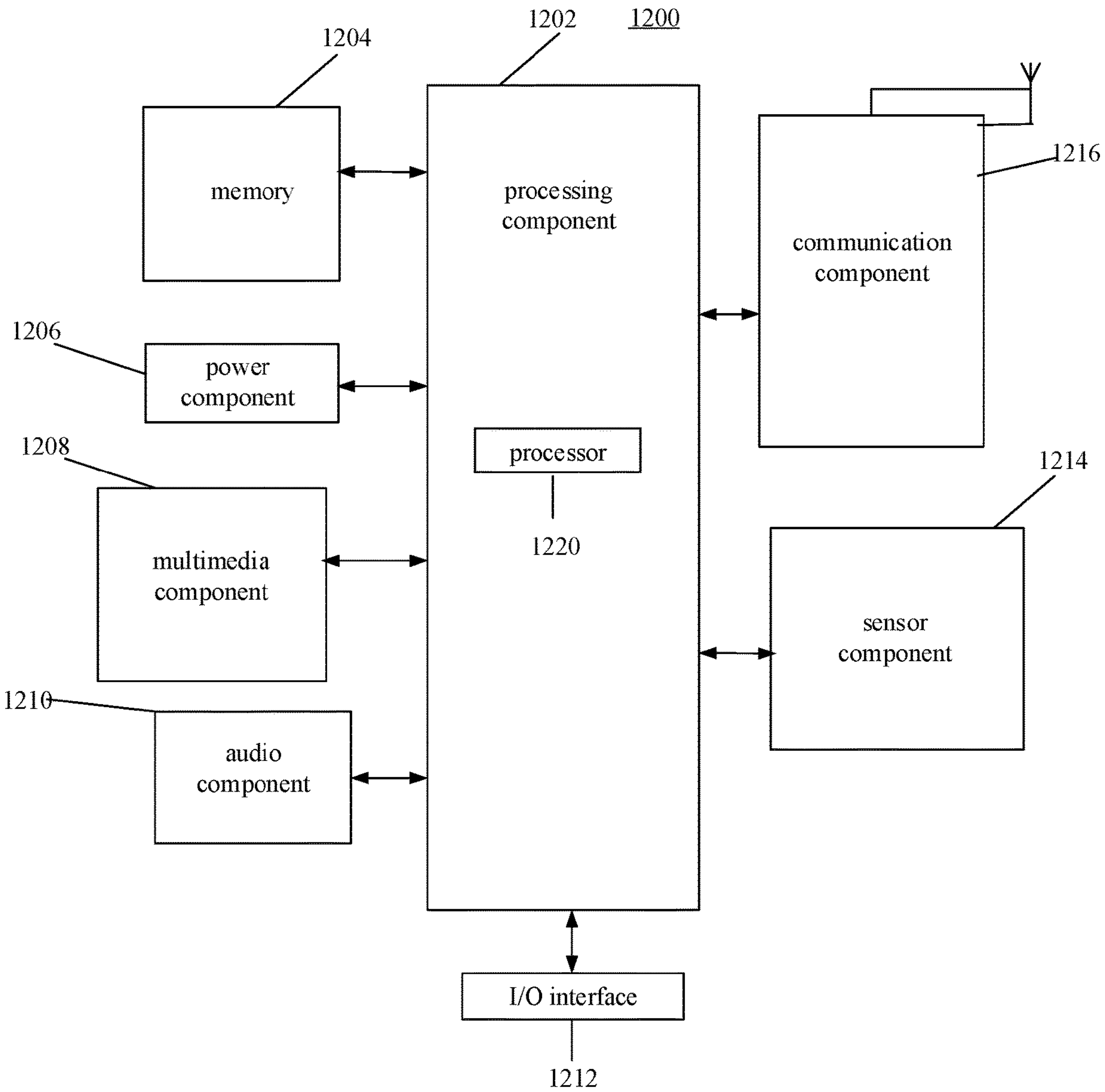
FIG. 12 is a structure diagram of a device for transmitting energy-saving indication information according to an embodiment of the disclosure.

FIG. 12 is a block diagram of a device 1200 for transmitting energy-saving indication information according to an embodiment of the disclosure. For example, the device 1200 may be a mobile phone, a computer, a digital broadcasting terminal, a message transceiver device, a game console, a tablet device, a medical device, a fitness device and a personal digital assistant.

As illustrated in FIG. 12, the device 1200 may include one or more of the following components: a processing component 1202, a memory 1204, a power component 1206, a multimedia component 1208, an audio component 1210, an input/output (I/O) interface 1212, a sensor component 1214, and a communication component 1216.

The processing component 1202 typically controls overall operations of the device 1200, such as the operations associated with display, telephone calls, data communications, camera operations, and recording operations. The processing component 1202 may include one or more processors 1220 to execute instructions to perform all or part of the steps in the above methods. Moreover, the processing component 1202 may include one or more modules which facilitate the interaction between the processing component 1202 and other components. For example, the processing component 1202 may include a multimedia module to facilitate the interaction between the multimedia component 1208 and the processing component 1202.

The memory 1204 is configured to store various types of data to support the operation of the device 1200. Examples of such data include instructions for any applications or methods operated on the device 1200, contact data, phonebook data, messages, pictures, videos, etc. The memory 1204 may be implemented using any type of volatile or non-volatile memory devices, or a combination thereof, such as a Static Random-Access Memory (SRAM), an Electrically-Erasable Programmable Read Only Memory (EEPROM), an Erasable Programmable Read Only Memory (EPROM), a Programmable Read Only Memory (PROM), a Read Only Memory (ROM), a magnetic memory, a flash memory, a magnetic or optical disk.

The power component 1206 provides power to various components of the device 1200. The power component 1206 may include a power management system, one or more power sources, and any other components associated with the generation, management, and distribution of power in the device 1200.

The multimedia component 1208 includes a screen providing an output interface between the device 1200 and a user. In some embodiments, the screen may include a Liquid Crystal Display (LCD) and a Touch Panel (TP). If the screen includes the touch panel, the screen may be implemented as a touch screen to receive input signals from the user. The touch panel includes one or more touch sensors to sense touches, swipes, and gestures on the touch panel. The touch sensor may not only sense a boundary of a touch or swipe action, but also sense a period of time and a pressure associated with the touch or swipe action. In some embodiments, the multimedia component 1208 includes a front-facing camera and/or a rear-facing camera. When the device 1200 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 1210 is configured to output and/or input audio signals. For example, the audio component 1210 includes a microphone (MIC) configured to receive an external audio signal when the device 1200 is in an operation mode, such as a call mode, a recording mode, and a voice recognition mode. The received audio signal may be further stored in the memory 1204 or transmitted via the communication component 1216. In some embodiments, the audio component 1210 further includes a speaker to output audio signals.

The I/O interface 1212 provides an interface between the processing component 1202 and peripheral interface modules, such as a keyboard, a click wheel, buttons, and the like. The buttons may include, but are not limited to, a home button, a volume button, a starting button, and a locking button.

The sensor component 1214 includes one or more sensors to provide status assessments of various aspects of the device 1200. For instance, the sensor component 1214 may detect an open/closed status of the device 1200, relative positioning of components, e.g., the display and the keypad, of the device 1200, a change in position of the device 1200 or a component of the device 1200, a presence or absence of user contact with the device 1200, an orientation or an acceleration/deceleration of the device 1200, and a change in temperature of the device 1200. The sensor component 1214 may include a proximity sensor configured to detect the presence of nearby objects without any physical contact. The sensor component 1214 may also include a light sensor, such as a Complementary Metal Oxide Semiconductor (CMOS) or Charge-Coupled Device (CCD) image sensor, for use in imaging applications. In some embodiments, the sensor component 1214 may also include an accelerometer sensor, a gyroscope sensor, a magnetic sensor, a pressure sensor, or a temperature sensor.

The communication component 1216 is configured to facilitate communication, wired or wirelessly, between the device 1200 and other devices. The device 1200 can access a wireless network based on a communication standard, such as Wi-Fi, 2G or 3G, or a combination thereof. In an embodiment, the communication component 1216 receives a broadcast signal from an external broadcast management system or broadcasts associated information via a broadcast channel. In an embodiment, the communication component 1216 further includes a Near Field Communication (NFC) module to facilitate short-range communication. For example, the NFC module may be implemented based on a RF Identification (RFID) technology, an Infrared Data Association (IrDA) technology, an Ultra-Wide Band (UWB) technology, a Blue Tooth (BT) technology, and other technologies.

In embodiments, the device 1200 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, for performing the above described methods.

In one embodiment, there is also provided a non-transitory computer-readable storage medium including instructions, such as the memory 1204 including instructions. The instructions can be executed by the processor 1220 of the device 1200 to complete the above methods. For example, the non-transitory computer-readable storage medium may be a ROM, a random access memory (RAM), a CD-ROM, a magnetic tape, a floppy disk, an optical data storage device, etc.

Figure 13:
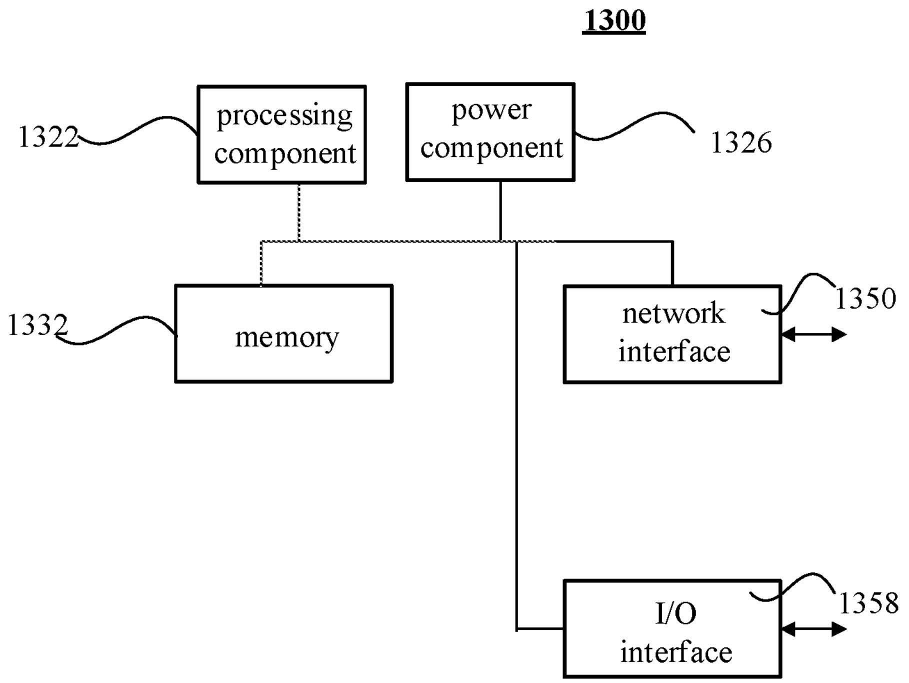
FIG. 13 is a structure diagram of a device for receiving energy-saving indication information according to an embodiment of the disclosure.

FIG. 13 is a block diagram of a device 1300 for receiving energy-saving indication information according to an embodiment of the disclosure. For example, the device 1300 may be provided as a base station. As illustrated in FIG. 13, the device 1300 includes a processing component 1322 consisting of one or more processors, and memory resources represented by a memory 1332 for storing instructions that may be executed by the processing component 1322, such as applications. The applications stored in the memory 1332 may include one or more modules each corresponding to a set of instructions. In addition, the processing component 1322 is configured to execute the instructions to perform any of the methods described above.

The device 1300 may also include a power component 1326 configured to perform power management of the device 1300, a wired or wireless network interface 1350 configured to connect the device 1300 to a network, and an I/O interface 1358. The device 1300 may operate based on an operating system stored in the memory 1332, such as Windows Server™, Mac OS X™, Unix™, Linux™, FreeBSD™, or the like.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as illustrative only, with a true scope and spirit of the disclosure being indicated by the following claims.

It will be appreciated that the disclosure is not limited to the exact construction that has been described above and illustrated in the accompanying drawings, and that various modifications and changes may be made without departing from the scope thereof. It is intended that the scope of the disclosure only be limited by the appended claims.

INDUSTRIAL UTILITY

The network device explicitly enables the PEI by sending the system message to the user device, so that the user device monitors paging DCI in a PO only when the PEI indicates the user device to monitor the paging DCI in its own PO, thereby avoiding unnecessary power consumption for waking up software and hardware for synchronization.

What is claimed is:

1. A method for transmitting energy-saving indication information, performed by a network device, comprising:

sending a system message to a user device, wherein the system message comprises information indicating enabling a paging early indication (PEI);

wherein the system message comprises a higher-layer parameter representing the information for indicating to enable the PEI, a number of user device groups corresponding to each paging occasion (PO) supported by the PEI, and a number of POs corresponding to the PEI; and in response to the network device being configured with a control resource set for transmitting the PEI, performing: configuring a common search space (CSS) for transmitting downlink control information (DCI) carrying the PEI, and transmitting the DCI carrying the PEI through the CSS.

2. The method of claim 1, further comprising:

transmitting the DCI carrying the PEI through one of: Type #0 CSS, Type #0-A CSS, Type #1 CSS, or Type #2 CSS.

3. The method of claim 1, further comprising:

in response to the network device not being configured with a control resource set for transmitting the PEI, transmitting DCI carrying the PEI based on a default CSS.

4. The method of claim 3, wherein the default CSS is specified by a communication protocol.

5. The method of claim 4, wherein the default CSS comprises one of:

a CSS for transmitting DCI for scheduling paging,

Type #0 CSS,

Type #0-A CSS,

Type #1 CSS, or

Type #2 CSS.

6. The method of claim 1, wherein one PEI corresponds to one PO or multiple POs.

7. The method of claim 1, wherein the information indicating enabling the PEI is used to configure a CSS for the DCI carrying the PEI.

8. A method for receiving energy-saving indication information, performed by a user device, comprising:

receiving a system message from a network device, wherein the system message comprises information indicating enabling a paging early indication (PEI);

wherein the system message comprises a higher-layer parameter representing the information for indicating to enable the PEI, a number of user device groups corresponding to each paging occasion (PO) supported by the PEI, and a number of POs corresponding to the PEI;

the network device being configured with a control resource set for transmitting the PEI, receiving downlink control information (DCI) carrying the PEI based on a common search space (CSS) for transmitting downlink control information (DCI) carrying the PEI.

9. The method of claim 8, further comprising:

determining at least one of the following specified by a communication protocol:

a number of user device groups corresponding to each PO supported by the PEI; or a number of POs corresponding to the PEI.

10. The method of claim 8, wherein the DCI carrying the PEI is received based on one of:

a common search space (CSS) for transmitting the DCI carrying the PEI,

Type #0 CSS,

Type #0-A CSS,

Type #1 CSS, or

Type #2 CSS.

11. The method of claim 8, further comprising:

in response to the network device not being configured with a control resource set for transmitting the PEI, receiving DCI carrying the PEI based on a default CSS.

12. The method of claim 11, wherein the default CSS is specified by a communication protocol.

13. The method according to claim 12, wherein the default CSS comprises one of:

a CSS for transmitting DCI for scheduling paging,

Type #0 CSS,

Type #0-A CSS,

Type #1 CSS, or

Type #2 CSS.

14. The method of claim 8, wherein one PEI corresponds to one PO or multiple POs.

15. The method of claim 8, wherein the information indicating enabling the PEI is used to configure a CSS for the DCI carrying the PEI.

16. A network device comprising:

a processor; and a memory for storing instructions executable by the processor;

wherein, the processor is configured to:

send a system message to a user device, wherein the system message comprises information indicating enabling a paging early indication (PEI);

wherein the system message comprises a higher-layer parameter representing the information for indicating to enable the PEI, a number of user device groups corresponding to each paging occasion (PO) supported by the PEI, and a number of POs corresponding to the PEI;

in response to the network device being configured with a control resource set for transmitting the PEI, the processor is configured to perform: configure a common search space (CSS) for transmitting downlink control information (DCI) carrying the PEI, and transmitting the DCI carrying the PEI through the CSS.

17. The network device of claim 16, wherein one PEI corresponds to one PO or multiple POs.

18. The network device of claim 16, wherein the information indicating enabling the PEI is used to configure a CSS for the DCI carrying the PEI.

19. A mobile terminal comprising:

a processor; and a memory for storing instructions executable by the processor;

wherein, the processor is configured to perform the method for receiving energy-saving indication information according to claim 8.

* * * * *